United States Patent [19]

Lang et al.

[11] 4,165,559

[45] Aug. 28, 1979

[54] RE-FORMABLE MULTI-CONDUCTOR FLAT CABLE

[75] Inventors: Roger J. Lang; Gary E. Lang, both of Garden Grove, Calif.

[73] Assignee: Eltra Corporation, Toledo, Ohio

[21] Appl. No.: 901,313

[22] Filed: May 1, 1978

Related U.S. Application Data

[62] Division of Ser. No. 736,309, Oct. 28, 1976, Pat. No. 4,113,335.

[51] Int. Cl.[2] .......... H02G 15/00

[52] U.S. Cl. .......... 29/629; 29/630 A; 156/55; 156/178

[58] Field of Search .......... 29/629, 628, 630 A, 29/423; 156/55, 52, 178, 179; 339/17 F, 176 MF; 174/17 F, 17 FF, 72 A, 72 TR

[56] References Cited

U.S. PATENT DOCUMENTS

| | | | |
|---|---|---|---|
| 3,704,164 | 11/1972 | Travis | 174/117 FF |
| 3,894,225 | 7/1975 | Chao | 339/17 F X |
| 4,034,148 | 7/1977 | Lang | 174/34 |
| 4,096,006 | 6/1978 | Paquin | 29/630 A X |

*Primary Examiner*—C. W. Lanham
*Assistant Examiner*—C. J. Arbes
*Attorney, Agent, or Firm*—I. Morley Drucker

[57] ABSTRACT

This invention relates to a re-formable multi-conductor flat, or ribbon, cable, which comprises a plurality of spaced insulated conductors, aligned in a predetermined, laterally spaced, pattern along a single sheet or film of plastic, the single sheet of plastic being only intermittently bonded to the laterally spaced conductors. The intermittent bonding pattern preferably utilized is one that results in transverse, peelably bonded, areas extending across the width of the entire cable alternating with transverse unbonded areas which also extend across the width of the entire cable. Cable harness units are formed from such cable, by severing a main cable along adjacent bonded areas, mass-terminating conductor ends within the bonded areas, severing the film in the non-bonded area to create a pair of tear tabs, removing the bonding films by exerting manual force on said tear tabs to free the intermediate portions of the conductors so that they may be re-arranged or re-formed to fit optimally within a confined space.

8 Claims, 8 Drawing Figures

UNBONDED
BONDED
UNBONDED
BONDED
UNBONDED
BONDED
BONDED
UNBONDED
BONDED
SLIT
BONDED
UNBONDED
BONDED
BONDED

RE-FORMABLE MULTI-CONDUCTOR FLAT CABLE

CROSS REFERENCE TO RELATED APPLICATIONS

This application is a divisional application of pending application Ser. No. 736,309, filed Oct. 28, 1976 and entitled: RE-FORMABLE MULTI-CONDUCTOR FLAT CABLE. This application is now U.S. Pat. No. 4,113,335.

BACKGROUND OF THE INVENTION

It is important to accurately space insulated multiple conductors with respect to each other, for ease of mass termination and other reasons, and laminated flat or ribbon, cable has increasingly come into use for this purpose. Both controlled regular spacing and controlled irregular spacing, of multiple conductors in ribbon cable form has been achieved, in the prior art, by laminating accurately spaced insulated (or uninsulated) multiple conductors between thin plastic film, such as 5 mil polyvinyl chloride (pvc) film or 5 mil Teflon* film.

* Teflon is a registered trademark of E. I. DuPont de Nemours, Wilmington, Del.

Multiple twisted pairs of insulated conductors have also been accurately spaced, in flat or ribbon cable, by laminating multiple pairs of twisted conductors between thin plastic film, the twisted pairs being first laid onto a lower plastic film, and encapsulated and accurately oriented by an upper plastic film laminated to the lower film. The use of twisted pairs of multi-conductor cable is of great importance in the field of communications, data processing and other applications where cross-talk, in signal transmission, must be kept to a minimum.

Laminated, multi-conductor cable of the type described is readily strippable, for mass termination purposes, or may be readily connected directly to insulation-displacing connectors (IDC'S) readily available in the art.

Where a particular electrical application requires mass termination of multiple conductors in a very confined space, laminated cable of the prior art may not be satisfactory because the intermediate portions of the flat cable may not be readily re-formed or rearranged into the confined space, even though the mass termination advantages of the laminated cable are still highly desirable. For example, a telephone junction box may have a limited amount of space, within which a plurality of electrical connectors must be placed very close to one another, together with a plurality of electrical conductors connected thereto. In such instances, the prior art, so far as we are aware, has utilized, primarily, individual termination of a multiplicity of individual conductors, and thereafter compressing or bunching the intermediate portions of the terminated, individual conductors to accomodate the remaining or available space within the junction box. There is little use of the laminated cable form in such applications because the intermediate portions of the laminated, flat, cable cannot readily be re-formed to accomodate the very limited confines of the junction box.

The applicants herein are aware of the following U.S. and foreign patents:

| PATENTEE | ISSUE DATE | | PATENT NO. |
|---|---|---|---|
| Soelberg | 9/3/74 | | 3,833,755 |
| Kigler | 5/7/57 | | 2,791,624 |
| Gore | 3/19/63 | | 3,082,292 |
| Dahlgren | 12/28/65 | | 3,226,473 |
| Gordon | 12/15/70 | | 3,547,718 |
| Wittenberg | 5/29/73 | | 3,736,366 |
| Hackethal-Draht Und Kabel-Werke, A.G. | 3/28/67 | French | 1,479,288 |

These patents all relate to various forms of laminated, multi-conductor, cable but do not present a solution to the aforedescribed problems.

The advances in the art set forth herein are directed, primarily, to a multi-conductor cable comprising precisely laterally aligned straight conductors, twisted pair conductors, or a combination of precisely laterally aligned twisted and straight conductors (of the type set forth in co-pending application Ser. No. 545,582, assigned to the assignee of this patent application) wherein after the mass termination of laterally aligned conductors has been completed, the remaining intermediate portions of the cable may be readily re-formed as by compression, bunching or the like, to readily assume a desired shape which fits within the limited space available in an optimum fashion.

SUMMARY OF THE INVENTION

This invention is directed to a multi-conductor flat cable which may readily assume a re-formed (e.g., irregular, bunched, or re-grouped) configuration, after mass termination of the ends thereof, in order to conform to very limited space considerations, without affecting, in any way, the ability to mass terminate the cable to IDC connectors or other types of mass termination connectors.

More specifically, this invention is directed towards a multi-conductor flat, or ribbon cable, comprising a plurality of laterally spaced, insulated, longitudinally extending, wire conductors, laterally aligned in a predetermined, precisely spaced, pattern on a single pliable sheet or film of plastic only. The laterally aligned and spaced conductors are intermittently bonded to one side of the single plastic sheet or film in a manner so as to form a bonded cable having segments or areas wherein the laterally aligned and spaced conductors are peelably bonded to the single sheet alternating with segments or areas of cable wherein the laterally aligned and spaced conductors are not bonded to the film at all.

The term "peelable bond" or "peelable bonding" as used herein and in the claims refers to a bond between the polymeric plastic bonding film and the polymeric plastic conductor insulation that has a substantially lower tensile strength than that of the tear strength of the bonding film—to thereby enable ready separation of the bonding film from the conductor insulation to take place under the application of manual force that can normally be exerted by a healthy man or woman. The peelable type of bonding of the bonding film to the insulation of the conductors is an important aspect of this invention.

A cable of the type described has substantial advantages over prior art cables of which we are aware. Thus, when a cable harness unit is to be formed from the cable, just-described, a given length of cable is severed from the main cable length in the peelably bonded areas such that the severed cable harness unit terminates in the peelable bonded areas and has at least one non-bonded segment therebetween. The ends of the just-described cable harness unit, within the terminal peelable bonded areas, may be stripped of the bonded film and/or conductor insulation, by any conventional means to expose precisely aligned bare conductor ends for mass termination to appropriate conventional, multiple conductor connectors. Alternatively, these terminal bonded areas may be mass terminated to conventional IDC's.

It is found, unexpectedly, that the use of a peelably bonded single sheet or film of plastic as the conductor aligning means is as satisfactory as the use of a pair of encapsulating plastic films in order to achieve quick, precise and reproducible mass termination.

Additionally, of course, the cost of providing a single side bonding sheet is materially less, both in terms of material and processing cost, as compared to the use of a pair of encapsulating sheets.

The harness cable unit is transversely slit in the non-bonded areas—either before or after mass termination to a connector—to thereby form a pair of tear tabs within each non-bonded area. The tear tabs provide a readily available handle means for manually removing the peelably bonded film from the cable harness unit—after mass termination of the ends of the cable unit has occurred. After the bonding film has been removed, those portions of the cable unit between the ends of each of the conductors are freely movable (just as are individual conductors whose ends are connected) and these freely movable conductors may then be reformed, bunched, or otherwise re-grouped or re-arranged into the available space, within a junction box, housing, or the like, without any of the constraints imposed by the original flat, or ribbon, conductor array.

DETAILED DESCRIPTION OF THE PREFERRED EMBODIMENTS OF THIS INVENTION

Figures 1, 2, 3, 4, 5, 6, 7, 8:
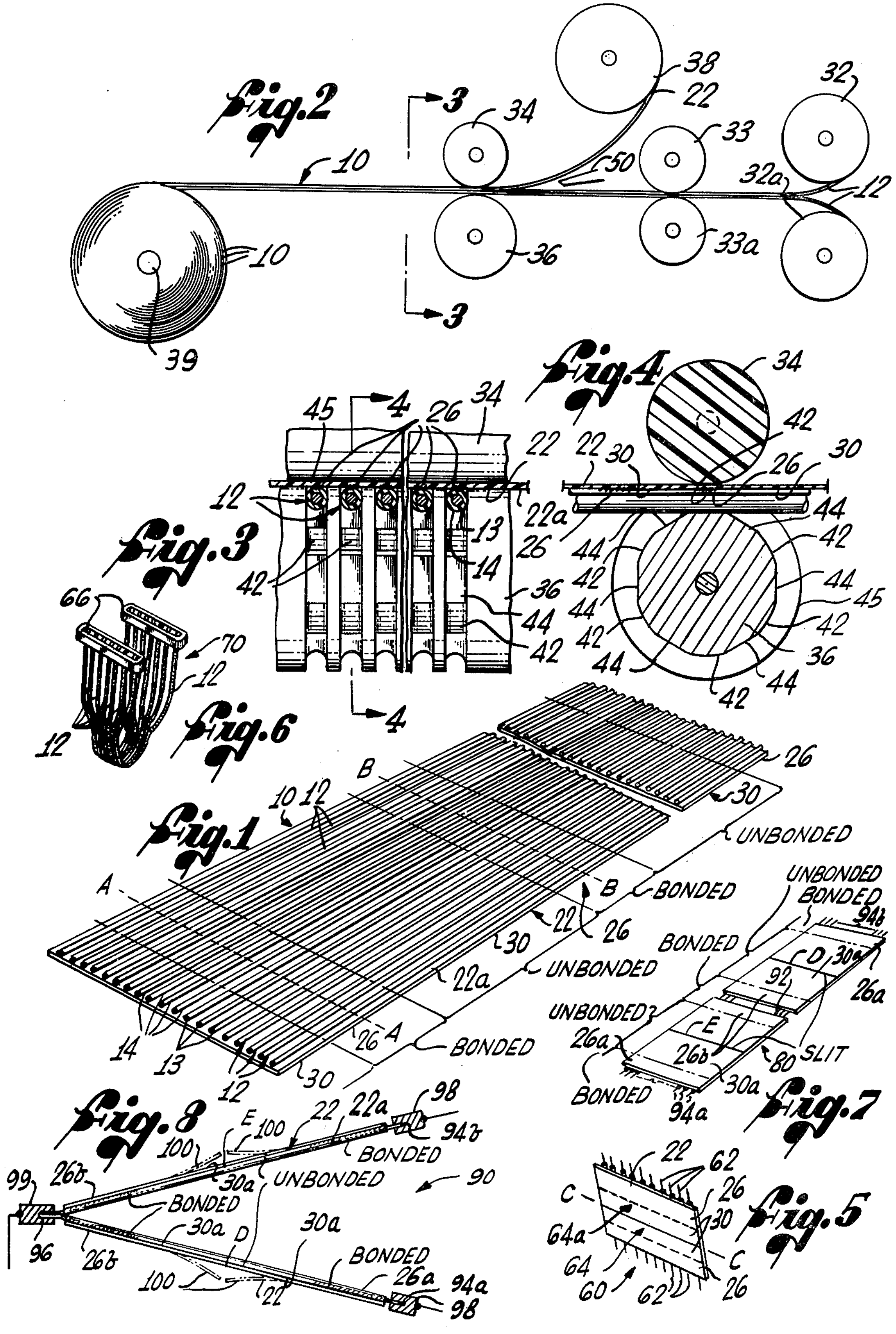
FIG. 1 is a perspective view of a preferred cable embodiment of this invention.
FIG. 2 is a schematic view, in side elevation, of apparatus for forming the preferred cable embodiment of this invention.
FIG. 3 is a partial elevational view taken along the line 3—3 of FIG. 2.
FIG. 4 is a cross-sectional view taken along the line 4—4 of FIG. 3.
FIG. 5 is a perspective view of a flat harness cable unit formed from the cable of this invention, and ready for mass termination.
FIG. 6 is a perspective view of the harness cable unit of FIG. 5 as connected to a pair of end connectors and after removal of the bonding film.
FIG. 7 is a perspective view of a second preferred embodiment of a flat harness cable unit, formed from the cable of this invention, ready for mass termination to a plurality of connectors.
FIG. 8 is a side-elevational view of the harness cable unit of FIG. 7, showing the folding thereof for connection to a pair of end connectors and to a third connector intermediate the end connectors.

One preferred embodiment of the re-formable multi-conductor ribbon cable of this invention is shown in perspective in FIG. 1 and is designated, generally, by the numeral 10. The cable 10 comprises a plurality of laterally aligned and laterally spaced insulated straight, single conductors 12, intermittently bonded to one side *22a* of a single plastic sheet or film 22 as will be described hereinafter.

Each insulated conductor 12 comprises a central metal conductor, e.g., of copper or aluminum 13, having a preferably round pvc, or other polymeric plastic, insulation 14 formed therearound. Twisted pairs of insulated conductor (not shown) or twist and straight combinations (as described in pending application, Ser. No. 545,582) may be employed, in place of straight conductors 12.

The plurality of conductors 12 are spaced on a thin pliable or flexible, laminating or bonding plastic film 22, along a predetermined regular or irregular lateral spacing pattern. A regular lateral spacing of conductors 12 is shown in FIG. 1. The plastic film 22 is preferably made of polyvinylchloride polymers, polyester, polyamides, or polyolefinic materials; but many other types of polymeric plastics may also be employed. The plastic film 22 is readily peelably bonded to the insulation 14 of the conductors 12, under the influence of heat and pressure.

The laterally aligned and spaced insulated conductors 12 are intermittently, peelably, bonded only to surface *22a* of plastic film 22. The bonded segments 26 preferably extend transversely across the entire width of the cable 10, the bonded segments 26 alternating with non-bonded segments 30. The non-bonded segments also preferably extend transversely across the entire width of the cable 10.

As previously mentioned, the bonded segments 26 are peelably bonded only rather than being permanently bonded. This permits a cable harness formed from the flat cable 10 to be re-formed, after the complete removal of the bonding film 22, as will be described in detail hereafter.

One method and means for forming the cable 10 of this invention will be described with reference to FIGS. 2–4, in particular.

A plurality of insulated conductors 12 are conveyed from supply rollers 32, *32a* (only two of which are shown in FIG. 2) through aligning rollers 33, *33a*, which rollers 33, *33a* positively align the conductors 12 in a horizontal plane. The plurality of horizontally aligned conductors 12 are then conveyed to and through rotatable laminating or bonding rollers 34, 36 along with a plastic film 22. The plastic film 22 is supplied from an upper film supply roller 38.

The upper bonding roller 34 is preferably made of hard rubber—and is completely circular in cross-section. The lower roller 36 is preferably made of aluminum and is provided with a series of laterally spaced grooves 42 extending circumferentially around the roller 36. The arcuate grooves 42 are interrupted by a series of alternating flat areas 44 machined into the circumference of grooves 42 of roller 36.

The lateral spacing of the grooves 42 corresponds to the desired lateral spacing between the conductors 12. The grooves 42 are machined into the roller such that their cross-sectional shape corresponds approximately to the cross-section of conductors 12; however, the groove depth is slightly less than the outer diameter of the conductors 12 so that an arcuate segment of the conductor surface will project from the grooves 42. Thus, at the instant when grooves 42 of rollers 36 are adjacent bonding film 22, as shown in FIGS. 3 and 4, tangential contact will be made between the film 22 and conductors 12. At the instant of contact, heating of both film 22 and conductors 12 takes place, e.g., by means of heated air, and the desired peelable bonding of the hot plastic film 22 to hot conductors 12 takes place under the pressure exerted by and between bonding rollers 34, 36.

The heat source, for heating the plastic film 22 and the conductor insulation 14, is preferably a supply of hot air, supplied through air nozzles 50 placed closely adjacent the bonding rollers 34, 36, as schematically shown in FIG. 2. The critical bonding time and temperature for both the conductor insulation and plastic film employed to achieve a peelable bonding is readily calculable by one skilled in the art, and normally falls within fairly broad ranges of time and temperature.

As the roller 36 continues to rotate to present a flat surface 44 adjacent upper roller 34, the conductors 12 are supported on such flat surface, and at this same time, the bonding film 22 is supported spacedly above the conductors 12 by means of the circumference of the walls 45 between grooves 42. Thus, a slight distance is maintained between bonding film 22 and conductor insulation when flat surface 44 is adjacent roller 34, and no bonding can take place between film 22 and conductor insulation 14.

It will be seen that the length of the alternating bonded segments and non-bonded segments of the cable 10 can be readily varied depending upon the length of the arcuate portions of the grooves 42 and the length of flat surfaces 44. In the embodiment of cable 10, and by way of example only, the non-bonded portions of the cable have a length of approximately about 2.0" compared to a bonded length of about 0.75".

Also, it will be seen, by reference to FIG. 3, that the bonding between film 22 and conductor insulation is tangential in nature although a truer surface-to surface bonding of film 22 to conductor insulation 14 may take place so long as the bond so formed is a peelable bonding, as earlier defined herein.

It will be understood from the foregoing that the intermittent bonding patterns and spacing and orientation of the conductors 12 may be varied considerably depending upon the configuration of the lower roller 36. The gauge and type of the wire utilized can also be readily varied by those skilled in the art.

After the cable 10 has passed through rollers 34, 36, it is cooled, by conventional means (not shown) and wound onto a take-up spool 39 (FIG. 2) for use at a later time.

Harness cable units 60, 70, 80 and 90, such as shown in FIGS. 5, 6, 7 and 8, respectively are examples of several presently preferred embodiments of cable units formed from the cable 10 of this invention.

Referring particularly to FIGS. 5 and 6, the harness cable unit 60 is formed, from cable 10 by first severing cable 10 laterally within bonded areas 26, to achieve a desired length, e.g., cable 10 may be severed along lines A—A and B—B (see FIG. 1). The ends of the cable unit 60 may then be stripped by conventional means (e.g., by the use of Carpenter stripper as shown in U.S. Pat. No. 3,385,140), to expose a given short length of bare conductors 62, for mass termination to a connector. It is to be noted that the ends 62 of cable unit are fixed relative to each other because they remain bonded to the film 22 after the stripping operation. As mentioned previously, the conductor ends need not be stripped if they are to be connected to IDC connectors.

The film 22 of cable unit 60 is then laterally slit or severed, along a line C—C, to form tear tabs 64, 64*a* (see FIG. 5). This operation may be performed before or after mass termination of the ends 62 of the cable unit 60.

After mass termination of the cable ends 62 of the cable unit 60 to connectors 66, the tear tabs are peelably removed, under the application of slight manual force, and the intermediate portions of the conductors 12 are now completely free to be re-formed, bunched, or otherwise grouped into a confined space, without the constraints provided by the bonding film. The final harness cable unit, with closely adjacent connectors 66 is designated by the numeral 70 in FIG. 6. Please note the re-grouped conductor 12.

The cable 10 may be formed into another embodiment of harness cable unit 80 (see FIGS. 7 and 8) wherein a cable 10 is laterally severed along lines within bonded areas 26*a*. In this embodiment, the terminal bonded areas 26*a* enclose one or more bonded areas 30*a* and two or more non-bonded areas 26*b*.

The harness cable unit 80 is formed into the final harness unit 90 of FIG. 8, by stripping a portion of the conductors 12, within bonded area 26*b* to expose bare conductors 92 as well as stripping the ends of cable unit 80 to expose bare conductors 94. The harness cable unit 80 may then be folded over along its central, transverse, axis to form intermediate connection pins, or points 96, as well as terminal connection pins 94. The connection pins 94, 96 are then mass terminated within multiple conductor connectors 98, 99, the bonding film 22 slit, within unbonded areas 30*a*, along lines D, E, to form tear tabs 100, shown in dotted line. Tears tabs 100 are then removed to enable re-forming of the freely movable conductors to the desired configuration.

It will be understood that the tape of peelable bonding herein contemplated includes solvent bonding and adhesive bonding of plastic film to conductor insulation, as well as bonding under heat and pressure. Various other modifications of this invention will become apparent to those skilled in the art. Hence, we intend to be bound only by the claims which follow.

We claim:

1. A method of making multi-conductor cable units, which comprises:

aligning a plurality of laterally spaced longitudinally extending insulated multiple conductors along one side of a single plastic film, intermittently bonding said laterally spaced conductors to said film to form a main cable having transversely extending segments of film peelably bonded to said laterally spaced conductors alternating with transversely extending segments of film which are not bonded to said laterally spaced multiple conductors, and severing said main cable within a plurality of peelably bonded segments to form a plurality of cable units.

2. The method of claim 1 which includes transversely severing said plastic film in each of said non-bonded segments to form tear tabs.

3. A method of making re-formable multi-conductor cable units, which comprises:

aligning a plurality of laterally spaced longitudinally extending insulated conductors along one side of a single plastic film, intermittently bonding said laterally spaced conductors to said film to form a main cable having transverse segments of plastic film peelably bonded to said laterally spaced conductors alternating with transverse segments of film unbonded to said laterally spaced conductors, transversely severing said main cable within a plurality of said peelably bonded segments to form a plurality of cable units, and mass terminating conductor ends within each of said peelably bonded segments of said cable units.

4. A method of making re-formable multi-conductor cable harness units, which comprises:

aligning a plurality of laterally spaced longitudinally extending insulated conductors along one side of a single plastic film intermittently bonding said laterally spaced conductors to said film to form a main cable having transverse segments of film peelably bonded to said laterally spaced conductors alternating with transverse segments of film not bonded to said laterally spaced conductors, transversely severing said main cable within a plurality of said peelably bonded segments to form a plurality of cable units, mass terminating conductor ends within each of said bonded segments of said cable units and transversely severing the film in a non-bonded segment of each of said cable units to form tear tabs.

5. The method of claim 4 wherein each of said cable units includes at least two of said peelably bonded segments separated by a non-bonded segment.

6. The method of claim 4 wherein each of said cable units includes at least three of said peelably bonded segments and at least two of said non-bonded segments, two of said peelably bonded segments being formed at each end of said cable unit and the third peelably bonded segment being formed centrally of the other two, each non-bonded segment separating any two of said peelably bonded segments.

7. The method of claim 6 which includes the steps of stripping the plastic film and conductor insulation along a transversely extending direction within said central peelably bonded segment, to expose bare conductors, and electrically interconnecting said exposed conductors to at least one electrical connector element.

8. The method of claim 4 which includes the steps of entirely removing said film from said cable unit by exerting manual force on said tear tabs to thereby produce said re-formable cable harness units.

* * * * *